US011645398B2

(12) United States Patent
Wu et al.

(10) Patent No.: US 11,645,398 B2
(45) Date of Patent: May 9, 2023

(54) SYSTEM AND METHOD FOR DATA REGISTRATION AND ACCESS

(71) Applicant: EMC IP Holding Company LLC, Hopkinton, MA (US)

(72) Inventors: Pengfei Wu, Shanghai (CN); Assaf Natanzon, Tel Aviv (IL); Stephen James Todd, North Conway, NH (US); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 739 days.

(21) Appl. No.: 16/530,947

(22) Filed: Aug. 2, 2019

(65) Prior Publication Data

US 2021/0034762 A1 Feb. 4, 2021

(51) Int. Cl.
*G06F 21/60* (2013.01)
*G06F 21/62* (2013.01)

(52) U.S. Cl.
CPC ........ *G06F 21/602* (2013.01); *G06F 21/6209* (2013.01); *G06F 21/6245* (2013.01); *G06F 2221/2141* (2013.01)

(58) Field of Classification Search
CPC ............... G06F 21/602; G06F 21/6245; G06F 21/6209; G06F 2221/2141
USPC ........................................................ 713/189
See application file for complete search history.

(56) References Cited

U.S. PATENT DOCUMENTS

| | | | |
|---|---|---|---|
| 5,774,876 A | 6/1998 | Woolley et al. | |
| 10,795,857 B2 | 10/2020 | Lin | |
| 2005/0192008 A1* | 9/2005 | Desai | H04L 67/1095 455/435.2 |
| 2017/0005804 A1* | 1/2017 | Zinder | G06F 21/6254 |
| 2017/0186057 A1* | 6/2017 | Metnick | G06Q 20/3827 |
| 2017/0230189 A1* | 8/2017 | Toll | H04L 9/0618 |
| 2018/0117447 A1* | 5/2018 | Tran | G06Q 20/382 |
| 2019/0080407 A1* | 3/2019 | Molinari | G06Q 20/06 |
| 2019/0140822 A1* | 5/2019 | Xie | H04L 9/0637 |
| 2019/0190719 A1* | 6/2019 | van de Ruit | H04L 9/0637 |
| 2019/0251078 A1* | 8/2019 | Yan | H04L 9/3239 |
| 2019/0251563 A1* | 8/2019 | Yan | H04L 9/14 |
| 2019/0361917 A1* | 11/2019 | Tran | G06Q 40/04 |
| 2020/0007544 A1* | 1/2020 | Wang | H04L 63/10 |

(Continued)

FOREIGN PATENT DOCUMENTS

WO  WO-2019067944 A1 * 4/2019 ............... B67D 7/04

OTHER PUBLICATIONS

NPL Search Terms (Year: 2022).*

(Continued)

*Primary Examiner* — Syed A Zaidi

(74) *Attorney, Agent, or Firm* — Chamberlain, Hrdlicka, White, Williams & Aughtry

(57) ABSTRACT

A data manager includes persistent storage and a data register. The persistent storage stores an identity chain and a data availability chain. The data register obtains data associated with an entity registered with the identity chain using a public key associated with the entity; obtains an object identifier associated with the data by storing the data in a data storage as a record; and records, on the data availability chain, both of: the record using a private key associated with the entity, and the object identifier.

16 Claims, 15 Drawing Sheets

(56) References Cited

U.S. PATENT DOCUMENTS

2020/0184085 A1* 6/2020 Korten ................ H04L 63/0442
2020/0295949 A1    9/2020 Ding et al.

OTHER PUBLICATIONS

"Terbine Opens First Nationwide System of Public Agency IoT Data"; Terbine; Jan. 9, 2019; https://web.archive.org/web/20190109213433/https://terbine.com/.
Henri Pihkala et al.; "Unstoppable Data for Unstoppable Apps: DATAcoin by Streamr"; Whitepaper, Version 1.0; Jul. 25, 2017.
Vincent Buttot; "DataBroker DAO new year's update by CEO & founder Matthew Van Niekerk"; Databroker—The Marketplace for Data; Jan. 10, 2019; https://databroker.online/blog/76.

* cited by examiner

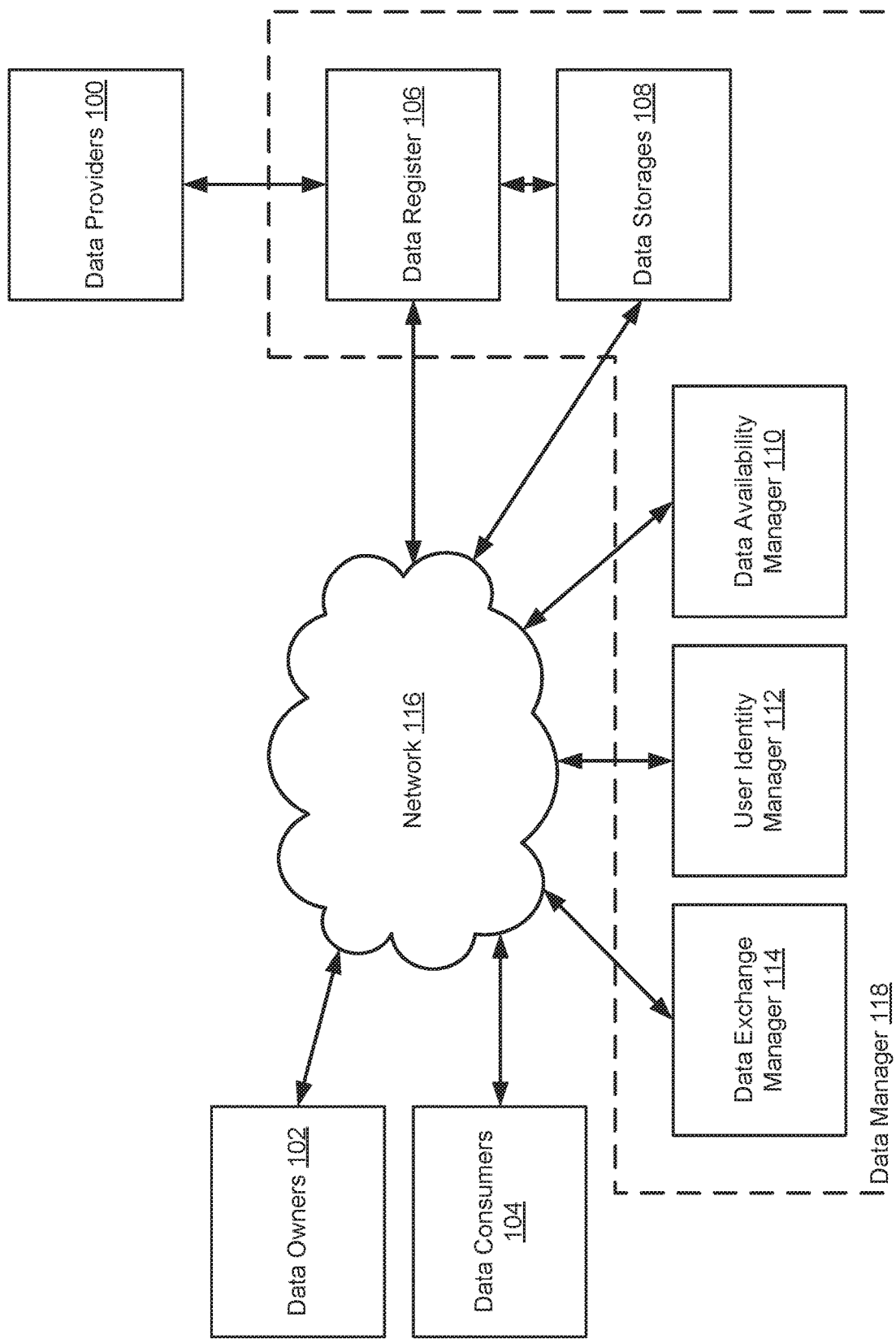
FIG. 1.1

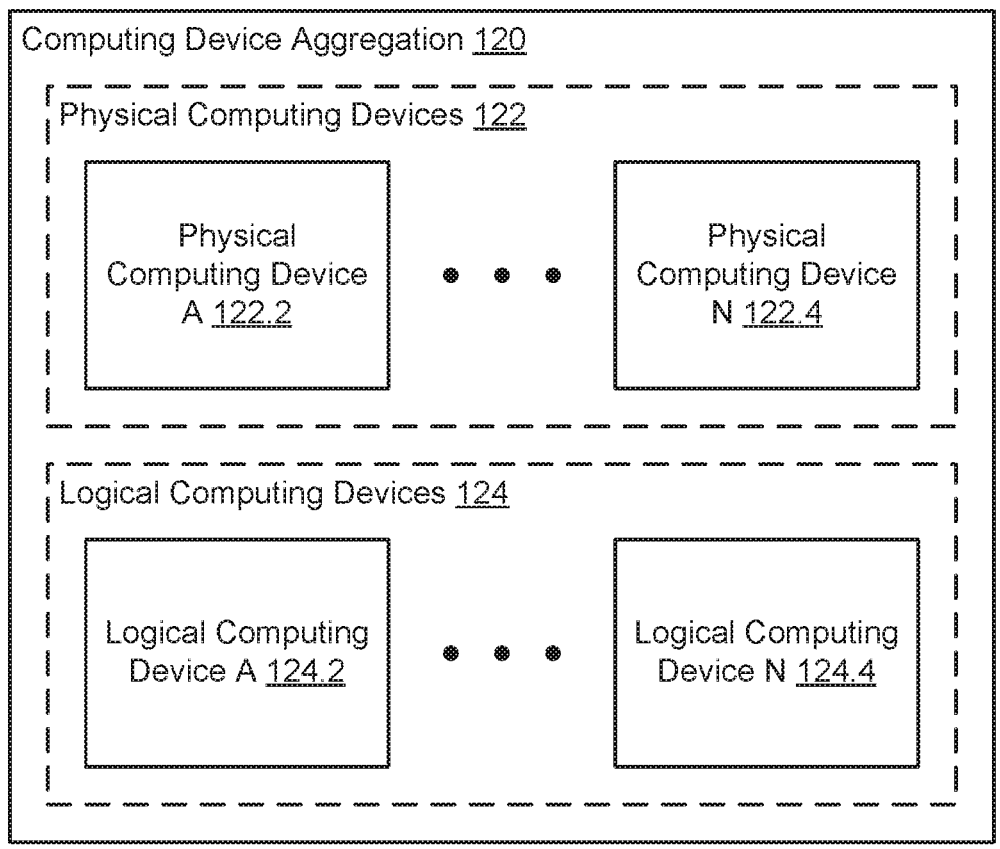
FIG. 1.2

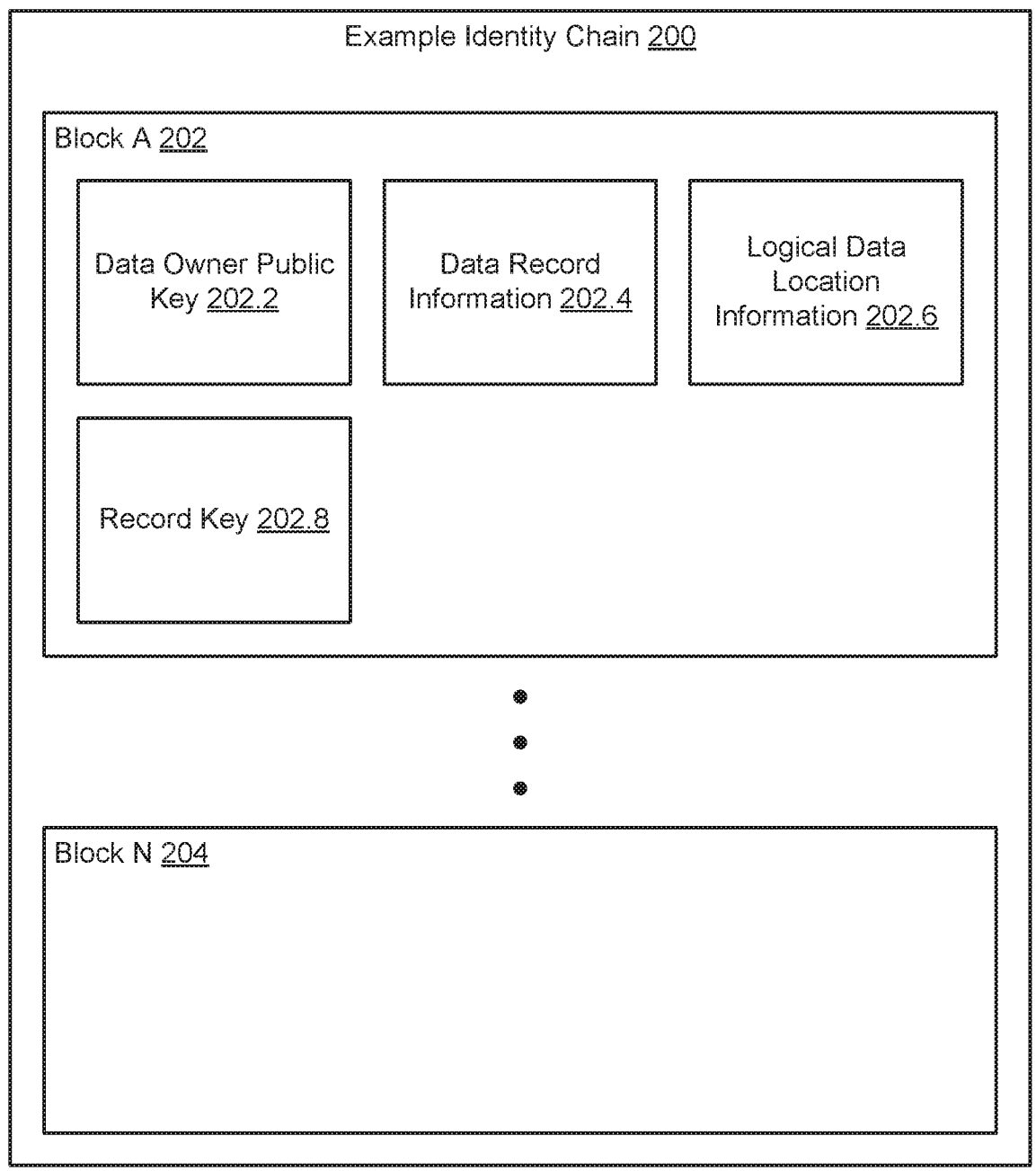
FIG. 2.1

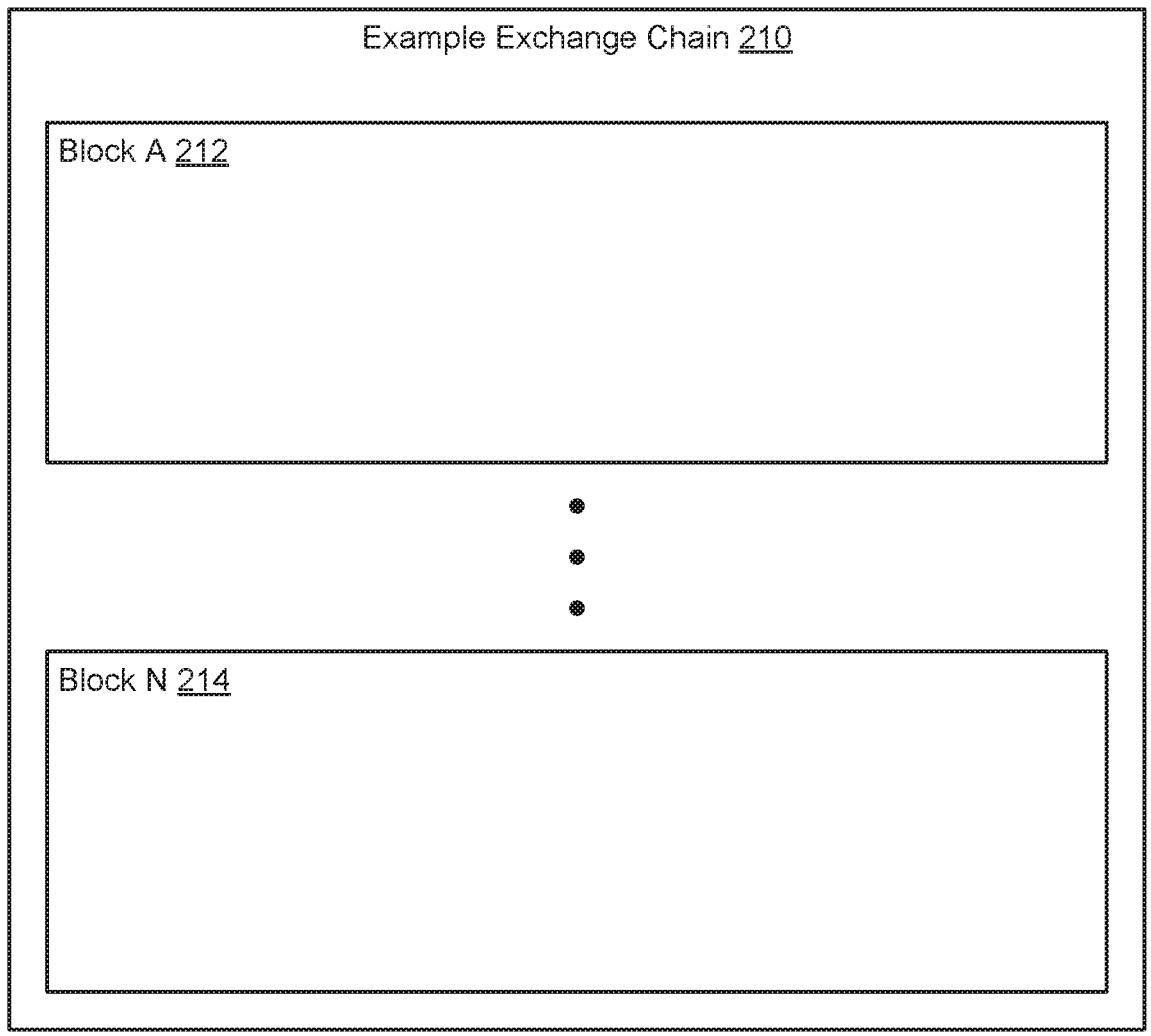
FIG. 2.2

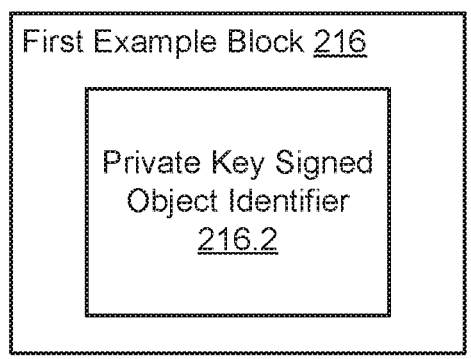
FIG. 2.3
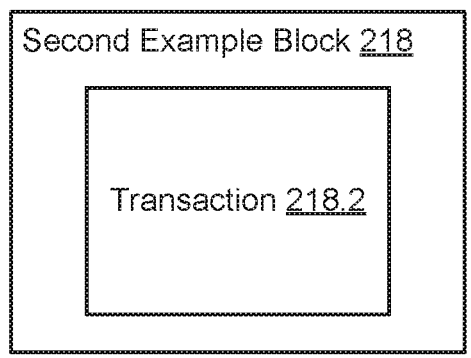
FIG. 2.4

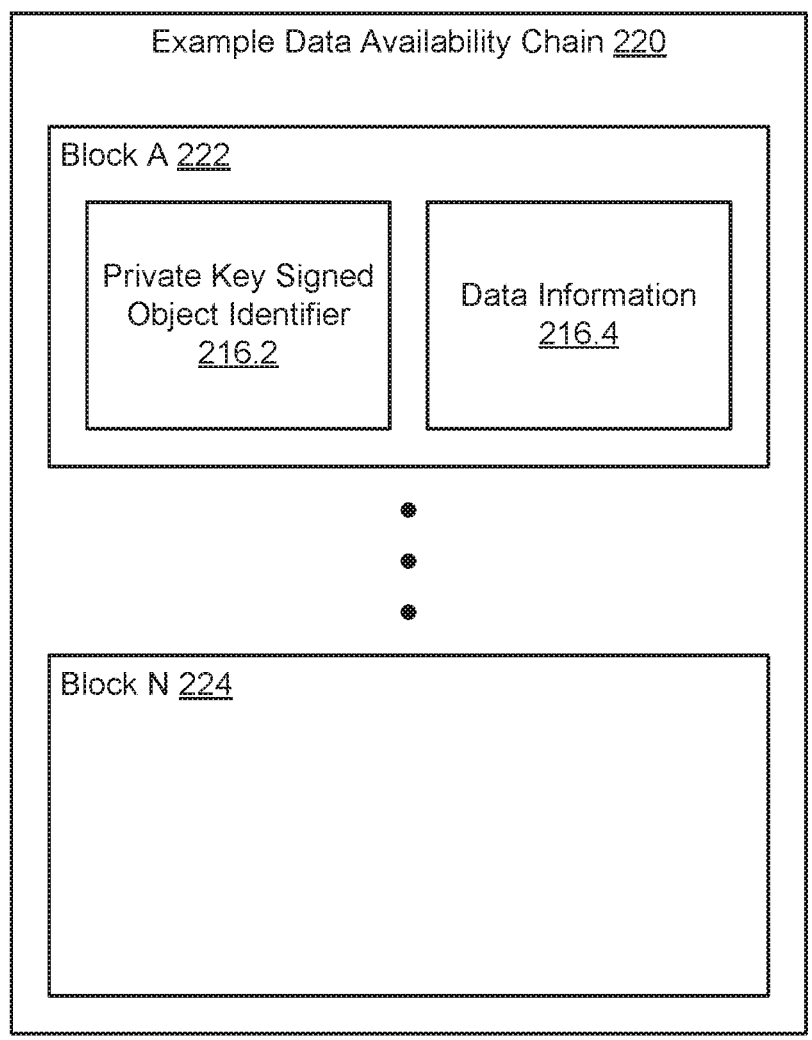
FIG. 2.5

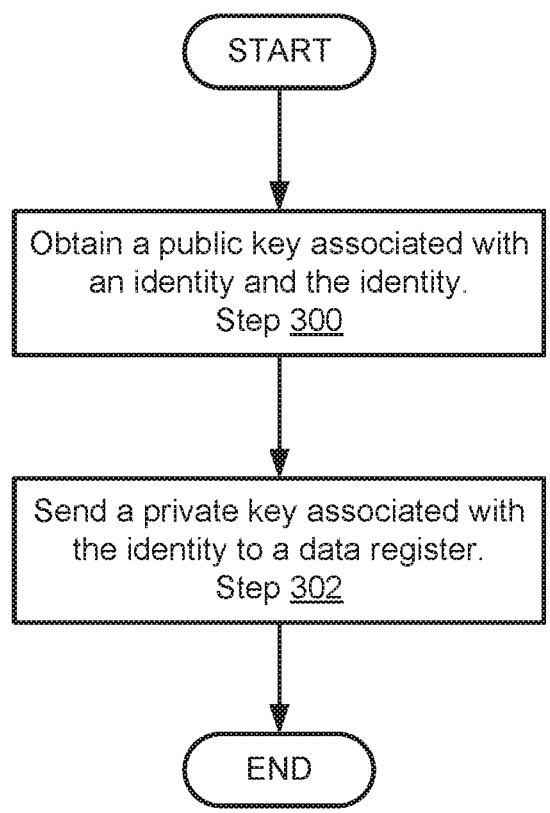
FIG. 3.1

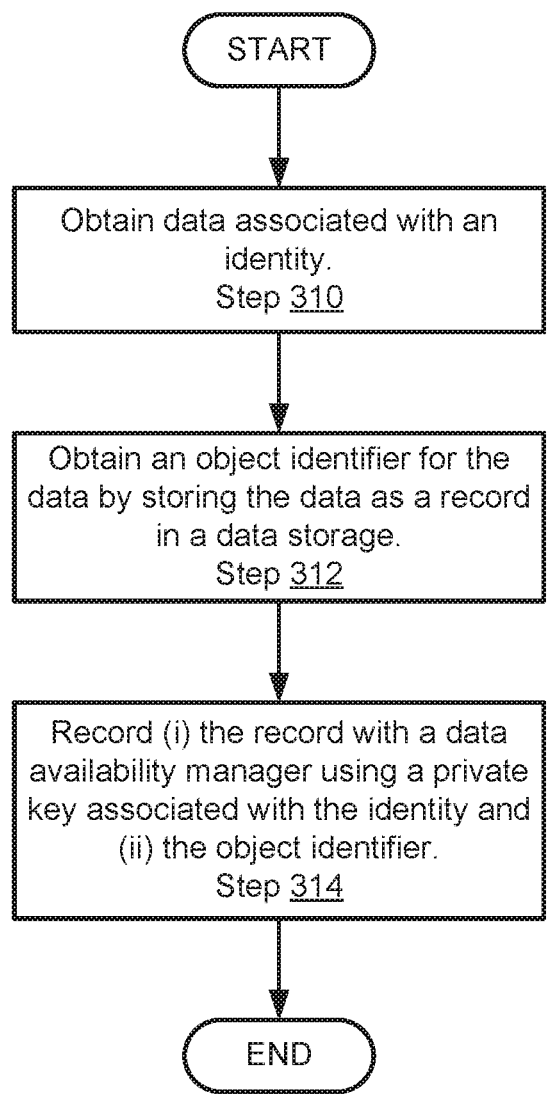
FIG. 3.2

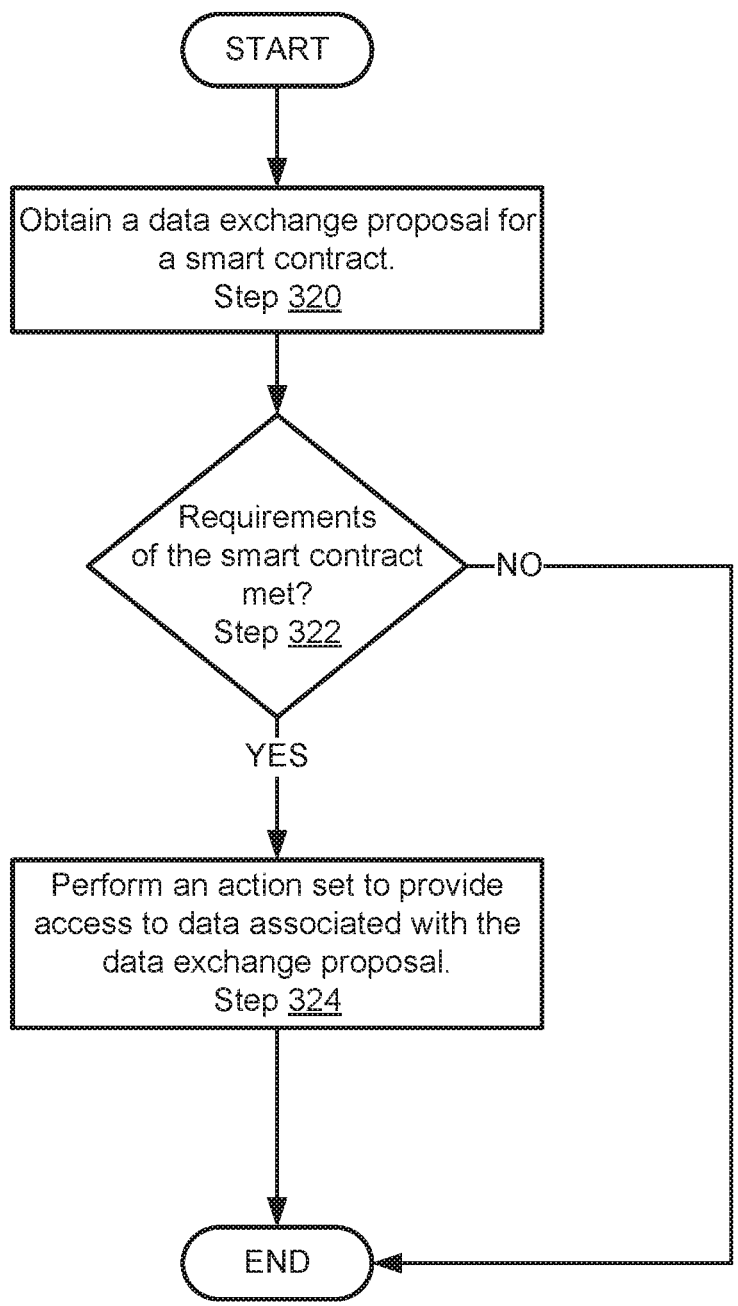
FIG. 3.3

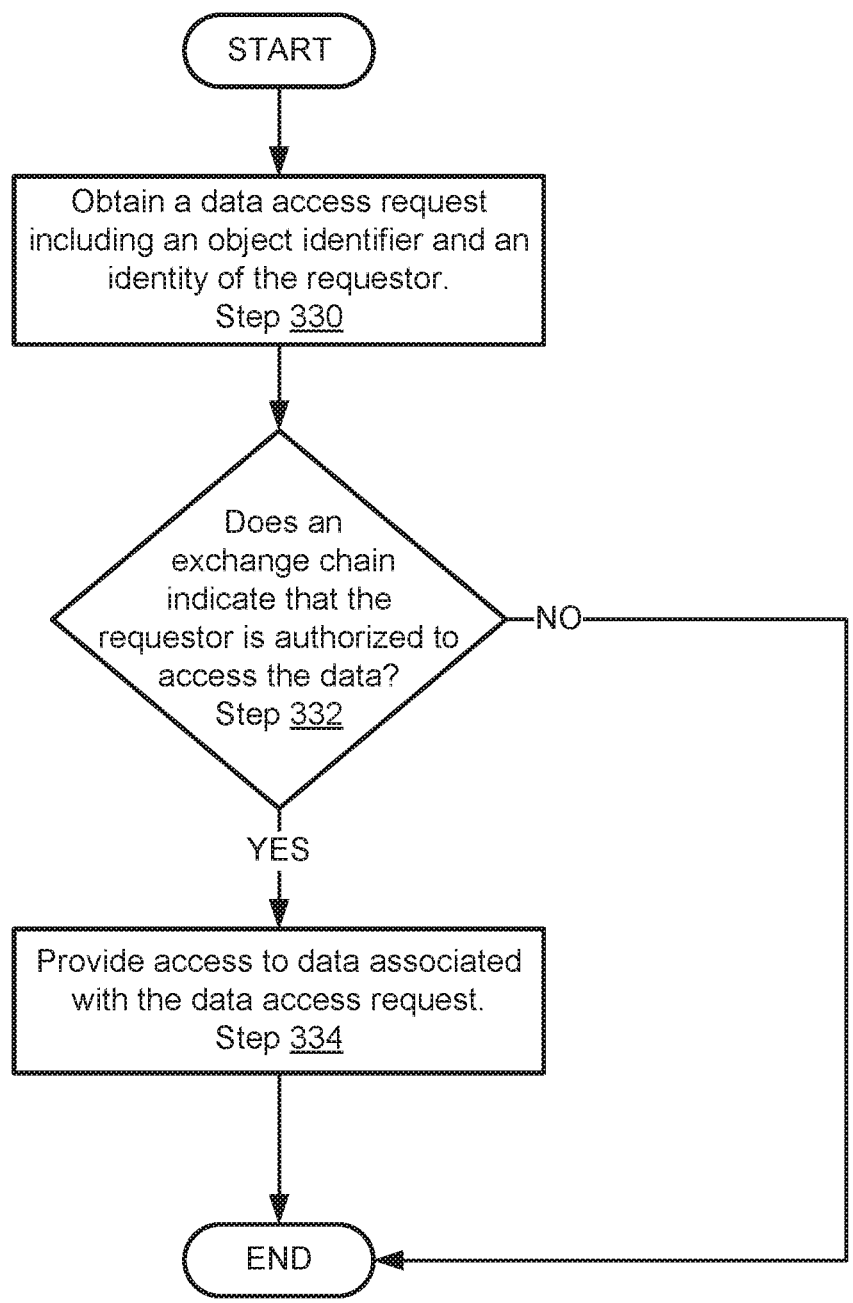
FIG. 3.4

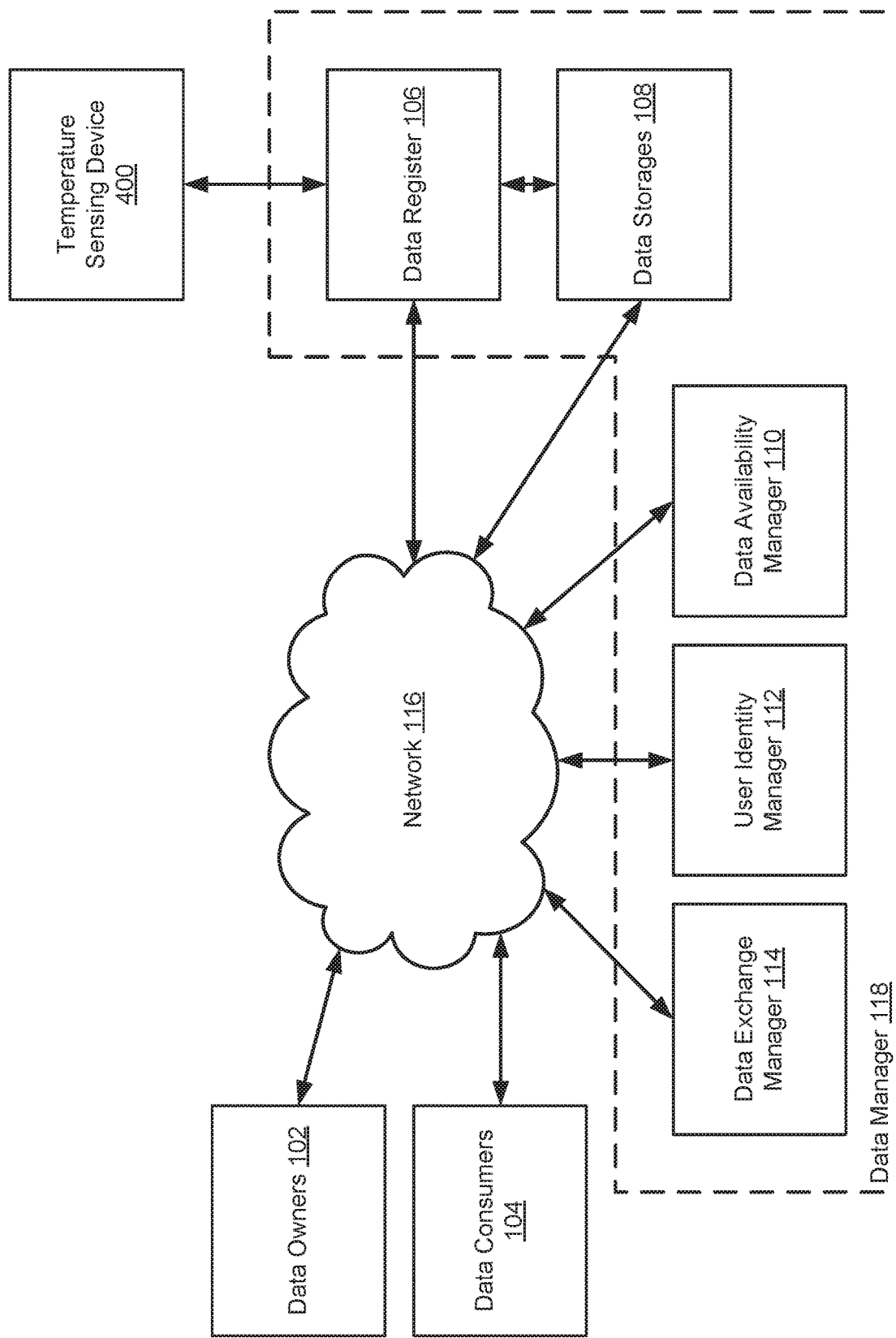
FIG. 4.1

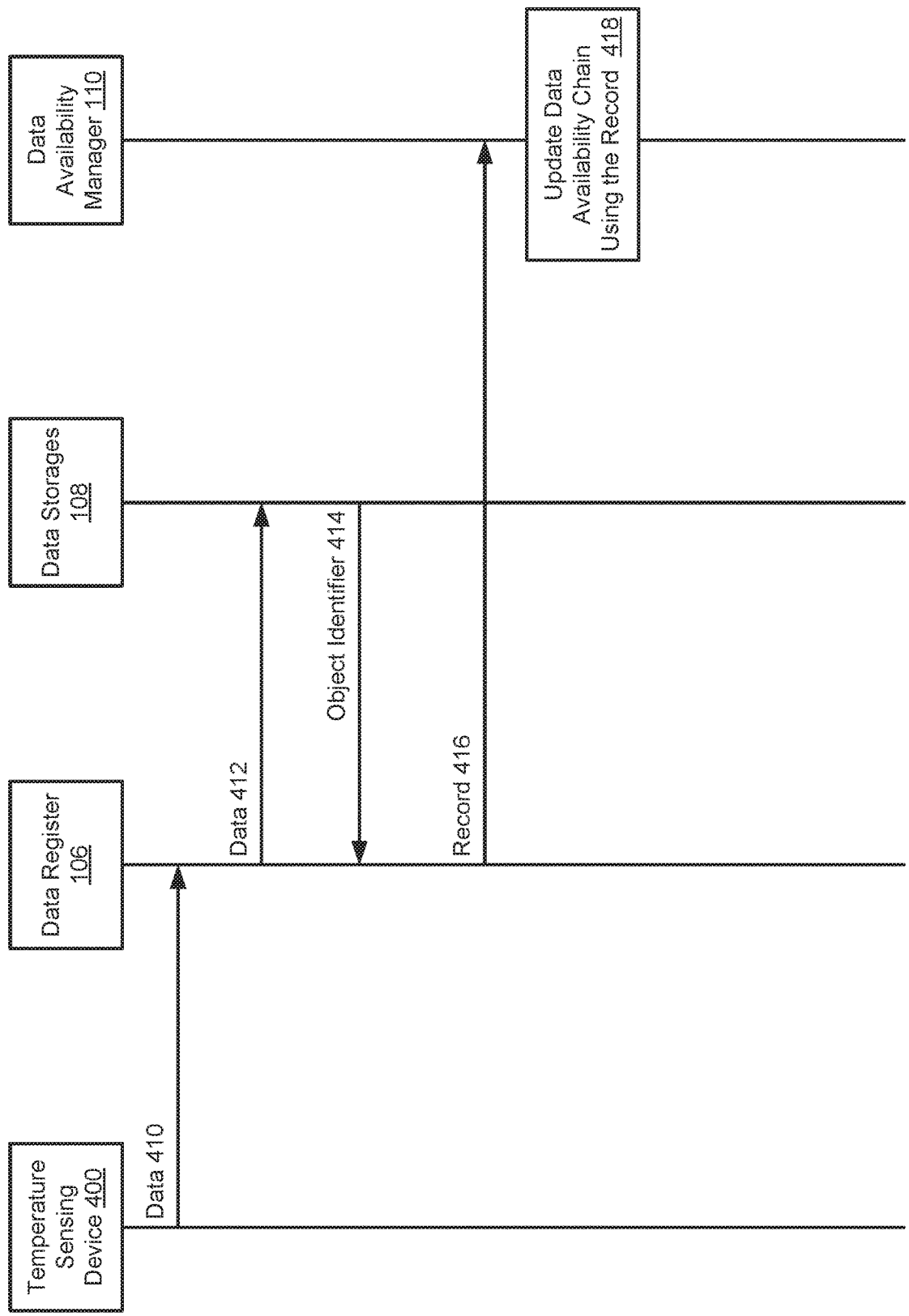
FIG. 4.2

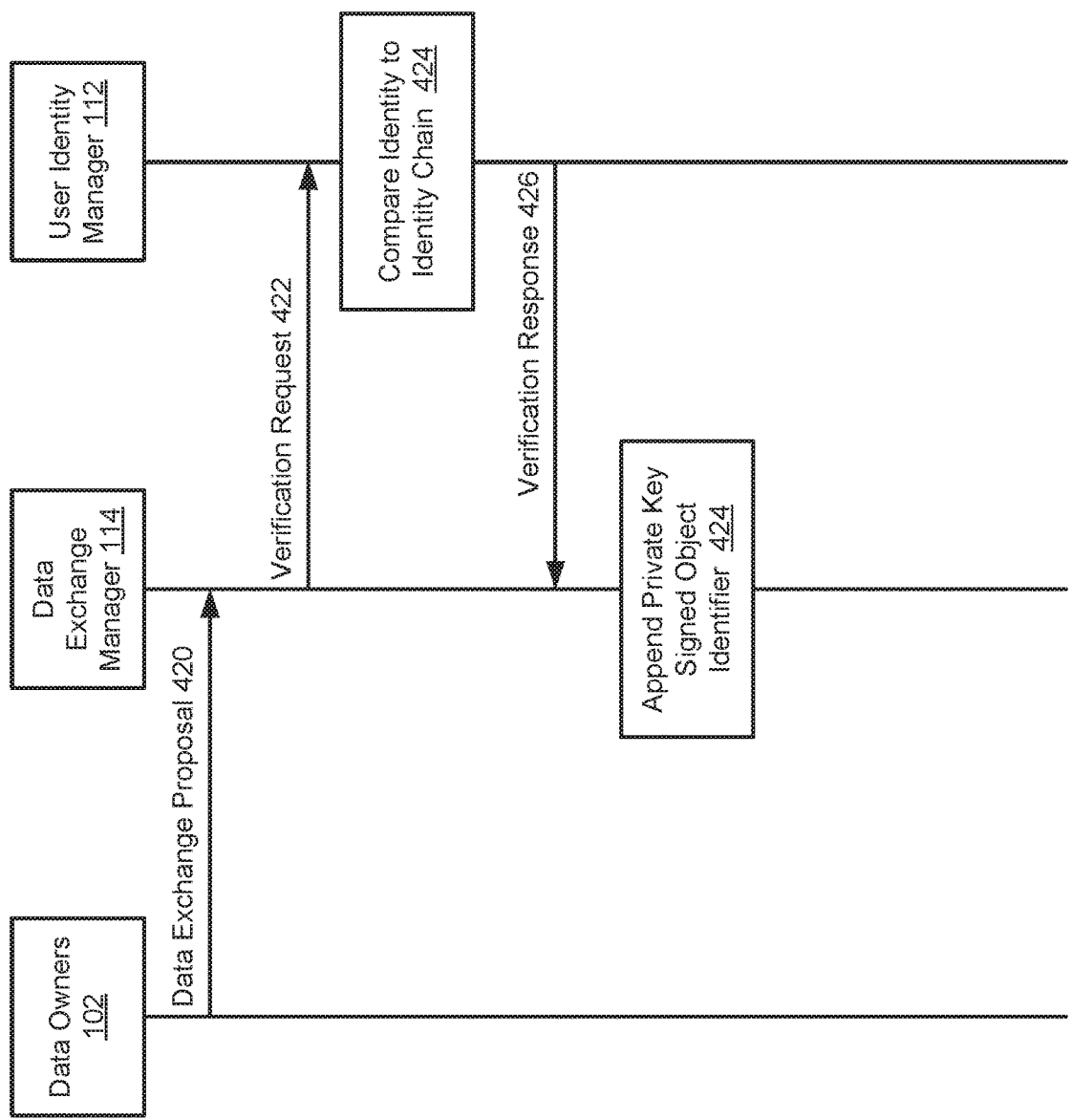
FIG. 4.3

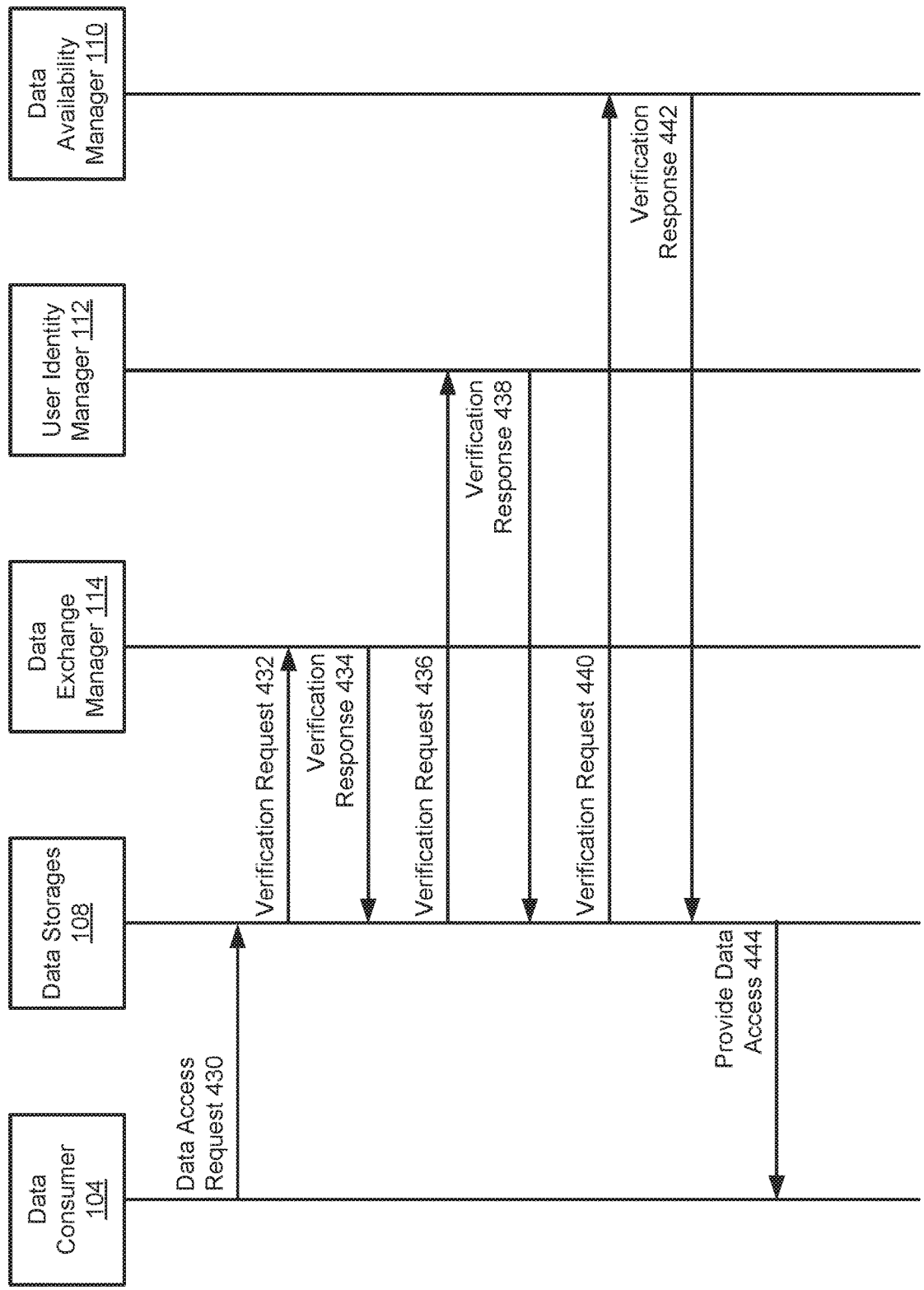
FIG. 4.4

SYSTEM AND METHOD FOR DATA REGISTRATION AND ACCESS

BACKGROUND

Devices may generate data that includes any type and quantity of information. As data is generated, it may need to be stored to be accessible in the future. When data is stored, the manner in which it is stored may impact the ability of the data to be utilized. For example, access controls may limit access to the data to a set number of predetermined users.

SUMMARY

In one aspect, a data manager in accordance with one or more embodiments of the invention includes persistent storage and a data register. The persistent storage stores an identity chain and a data availability chain. The data register obtains data associated with an entity registered with the identity chain using a public key associated with the entity; obtains an object identifier associated with the data by storing the data in a data storage as a record; and records, on the data availability chain, both of: the record using a private key associated with the entity, and the object identifier.

In one aspect, a method of operating a data manager in accordance with one or more embodiments of the invention includes obtaining data associated with an entity registered with an identity chain using a public key associated with the entity; obtaining an object identifier associated with the data by storing the data in a data storage as a record; and recording, on a data availability chain, both of: the record using a private key associated with the entity, and the object identifier.

In one aspect, a non-transitory computer readable medium in accordance with one or more embodiments of the invention includes computer readable program code, which when executed by a computer processor enables the computer processor to perform a method for operating a data manager. The method includes obtaining data associated with an entity registered with an identity chain using a public key associated with the entity; obtaining an object identifier associated with the data by storing the data in a data storage as a record; and recording, on a data availability chain, both of: the record using a private key associated with the entity, and the object identifier.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention, FIG. 1.2 shows a diagram of a computing device aggregation in accordance with one or more embodiments of the invention.

FIG. 2.1 shows a diagram of an example identity chain in accordance with one or more embodiments of the invention.

FIG. 2.2 shows a diagram of an example exchange chain in accordance with one or more embodiments of the invention.

FIG. 2.3 shows a diagram of a first example block in accordance with one or more embodiments of the invention.

FIG. 2.4 shows a diagram of a second example block in accordance with one or more embodiments of the invention.

FIG. 2.5 shows a diagram of an example data availability chain in accordance with one or more embodiments of the invention.

FIG. 3.1 shows a flowchart of a method of registering a user in accordance with one or more embodiments of the invention.

FIG. 3.2 shows a flowchart of a method of storing data in accordance with one or more embodiments of the invention.

FIG. 3.3 shows a flowchart of a method of managing access to data in accordance with one or more embodiments of the invention.

FIG. 3.4 shows a flowchart of a method of providing data in accordance with one or more embodiments of the invention.

FIG. 4.1 shows a diagram of an example system, similar to the system of FIG. 1.1.

FIG. 4.2 shows a first interaction diagram of actions performed by the example system of FIG. 4.1.

FIG. 4.3 shows a second interaction diagram of actions performed by example system of FIG. 4,1.

FIG. 4.4 shows a third interaction diagram of actions performed by the example system of FIG. 4.1.

DETAILED DESCRIPTION

Figure 5:
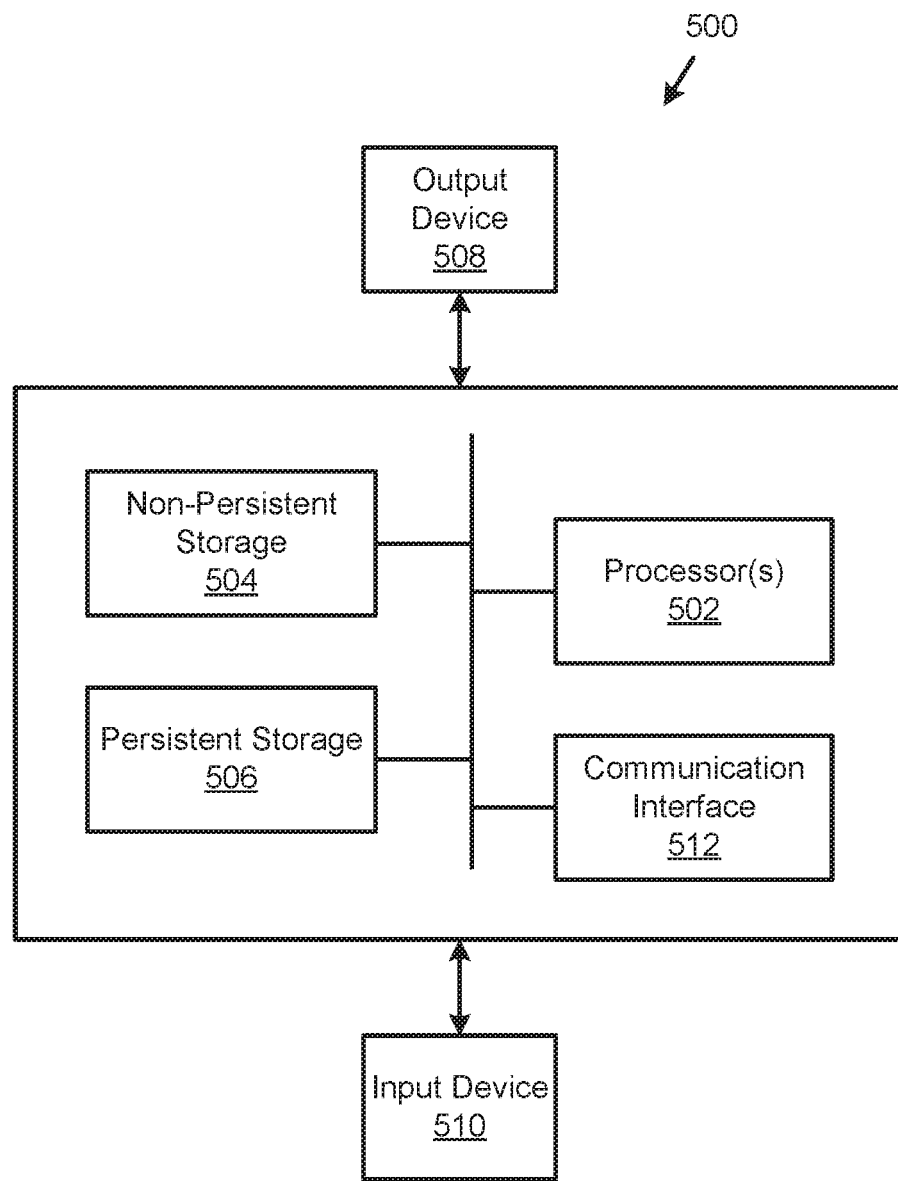
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. A data manager in accordance with embodiments of the invention may manage data for any number of entities. The data may be, for example, data stream from devices such as Internet of Things (IOT) devices. To manage the data, the data manager may store the data and provide access to the data.

Over time, different users may require access to the data. To facilitate access to the data, the data manager may register data upon storage. The registration may be appended to a distributed data structure, such as a block chain, that enables other entities to, at least in part, verify the accuracy of the data. By doing so, an end to end envelope of trust between owner of data, the data manager, and other users of the data may be formed. Similar data structure may be used to manage the identities of users that utilize services provided by the data manager, provide access to data to users that did not previously have access to the data, and/or inform users of data to which the users may gain access.

FIG. 1.1 shows a system in accordance with one or more embodiments of the invention. The system may include any number of data providers (100) that provide data to a data manager (118) for storage. The data provided by the data providers (100) may be associated with data owners (102) that are associated with the provided data. For example, different data providers (100) may have different rights with respect to different portions of the provided data.

Once data is (and/or will be) provided by the data providers (100) to the data manager (118), data consumers (104) may desire access to the data managed by the data manager (118). To facilitate provisioning of access to the aforementioned data, the data manager (118) may manage one or more data structures, such as block chains, that include information regarding data ownership, information regarding data that is managed by the data manager (118), information regarding the data owners (102), and/or information regarding how the data consumers (104) may access the stored data.

By providing data management services to the data owners (102), the data consumers (104), and/or other entities, the data manager (118) may enable any number of entities (e.g., data consumers, data owners) to access data that is managed by the data management (118). As part of providing the data management services, the data manager (118) may provide a secure method for storing and accessing data managed by the data manager (118). Additionally, the method of securely storing and accessing data may facilitate providing access to the data to any number of entities including data owners (102), data consumers (104), and/or other entities. By doing so, access to data in a distributed environment may be provided securely while facilitating provisioning of access to the data.

All, or a portion, of the components of the system illustrated in FIG. 1.1 may be operably connected to each other and/or other entities via any combination of wired and/or wireless connections. For example, the aforementioned components may be operably connected, at least in part, via a network (116). The network (116) may be any type of communications network and provide communication services by implementing any communication protocol. The aforementioned components of the system may be operably connected to the network (116) which, in turn, facilitates communications between the aforementioned components and/or other components of the system. Each component of the system of FIG. 1.1 is discussed below.

The data providers (100) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data providers (100) may be other types of computing devices without departing from the invention. For additional details regarding computing devices, refer to FIG. 5.

The data providers (100) may be implemented using logical devices without departing from the invention. For example, the data providers (100) may be implemented using virtual machines or other types of logical entities that utilize computing resources of any number of physical computing devices to provide the functionality of the data providers (100). The data providers (100) may be other types of logical devices without departing from the invention.

In one or more embodiments of the invention, the data providers (100) provide data. The data may be any type and/or quantity of data. The data providers (100) may obtain the data from any source.

For example, the data may include video stream data from a camera. In another example, the data may include state images from a camera. In a still further example, the data may be obtained from an internet of things device. The data provided by the data providers (100) may include any type and/or content of data.

In one or more embodiments of the invention, the data providers (100) include information regarding a source of the data (e.g., a device/domain/unique identifier/etc.) when providing the data. As will be discussed in greater detail below, such information may be used to associate provided data with one or more of the data owners (102).

For example, one or more of the data providers (100) may be associated with one or more of the data owners (102). When such data providers (100) provide data, they may include an identifier associated with the data owner, which is associated with the data provider that provided all, or a portion, of the data. By doing so, the data manager (118) may be notified of an association between the data, as received by the data manager (118), and one or more of the data owners (102). The aforementioned associations may be communicated to the data manager (118) via other methods without departing from the invention.

The data register (106) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data register (106) may be other types of computing devices without departing from the invention. For additional details regarding computing devices, refer to FIG. 5.

The data register (106) may be implemented using logical devices without departing from the invention. For example, the data register (106) may be implemented as virtual machines or other types of logical entities that utilize computing resources of any number of physical computing devices to provide the functionality of the data register (106). The data register (106) may be other types of logical devices without departing from the invention.

In one or more embodiments of the invention, the data register (106) manages the intake of data from the data providers (100) (and/or other entities) for storage by the data manager (118). To manage the intake of data, the data register (106) may store a copy of the data in the data storages (108) and append information regarding the stored data to one or more distributed data structures managed by the data exchange manager (114), the user identity manager (112), and/or the data availability manager (110). The one or more distributed data structure may be implemented using block chains or other types of trusted data structures. For additional details regarding the distributed data structures, refer to FIGS. 2.1-2.5.

By appending the information to the distributed data structures, the data manager (118) may provide a method for managing stored data in a manner that is trusted and verifiable. As will be discussed in greater details below, the use of distributed data structures by the data manager (118) may engender trust in the data manager (118) by users of the data manager (118) (e.g., data owners, data consumers, and/or other entities).

While the data manager (118) is illustrated as including a single data register (106) for simplicity, a system in accordance with one or more embodiments of the invention may include any number of registers without departing from the invention.

The data availability manager (110) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc., The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data availability manager (110) may be other types of computing devices without departing from the invention. For additional details regarding computing devices, refer to FIG. 5.

The data availability manager (110) may be implemented using logical devices without departing from the invention. For example, the data availability manager (110) may be implemented as virtual machines or other types of logical entities that utilize computing resources of any number of physical computing devices to provide the functionality of the data availability manager (110). The data availability manager (110) may be other types of logical devices without departing from the invention.

In one or more embodiments of the invention, the data availability manager (110) is implemented using a computing device aggregation. A computing device aggregation may be a collection of logical and/or physical devices that cooperatively perform one or more functionalities. Different devices of the computing device aggregation may perform other types of functionalities in addition to the cooperatively performed one or more functionalities. By performing the one or more functionalities, the cooperative behavior of the computing device aggregation may give rise to the functionality of the data availability manager. For additional details regarding a computing device aggregation, refer to FIG. 1.2.

In one or more embodiments of the invention, the data availability manager (110) manages a distributed data structure that includes information regarding the availability of data stored in the data manager (118). For example, the data availability manager (110) may maintain a trusted distributed data structure such as, for example, a block chain. For additional details regarding a block chain that includes information regarding the availability of data in the data manager, refer to FIG. 2.5.

To manage the distributed data structure, the data availability manager (110) may include functionality to enable other entities to append data to the distributed data structure. For example, the data availability manager (110) may enable the data register (106) to append data to the distributed data structure.

In one or more embodiments of the invention, the data availability manager (110) provides a method for engendering trust with other entities regarding the accuracy of information included in the distributed data structure. For example, the data availability manager (110) may implement any block chain management protocol (or other data management protocol) that enables other entities to, at least in part, verify the validity of data included in the distributed data structure. The data availability manager (110) may implement other data management protocols without departing from the invention.

Additionally, the data availability manager (110) may include functionality to enable other entities to read data included in the distributed data structure. For example, data consumers (104) may desire to read data from the distributed data structure that enables them to determine the type and/or content of data structures stored in the data storages (108) and/or other locations.

The user identity manager (112) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The user identity manager (112) may be other types of computing devices without departing from the invention. For additional details regarding computing devices, refer to FIG. 5.

The user identity manager (112) may be implemented using logical devices without departing from the invention. For example, the user identity manager (112) may be implemented as virtual machines or other types of logical entities that utilize computing resources of any number of physical computing devices to provide the functionality of the user identity manager (112). The user identity manager (112) may be other types of logical devices without departing from the invention.

In one or more embodiments of the invention, the user identity manager (112) is implemented using a computing device aggregation. A computing device aggregation may be a collection of logical and/or physical devices that cooperatively perform one or more functionalities. Different devices of the computing device aggregation may perform other types of functionalities in addition to the cooperatively performed one or more functionalities. By performing the one or more functionalities, the cooperative behavior of the computing device aggregation may give rise to the functionality of the data availability manager. For additional details regarding a computing device aggregation, refer to FIG. 1.2.

In one or more embodiments of the invention, the user identity manager (112) provides entity registration services. Entity registration services may include generating and storing of records regarding entities that desire to store and/or obtain data in the data manager (118). When generating such records, the user identity manager (112) may store such records in a distributed data structure that includes information regarding entities utilizing services provided by the data manager (118). For example, the user identity manager (112) may maintain a trusted distributed data structure such as, for example, a block chain. For additional details regarding a block chain that includes information regarding entities that may utilize services offered by the data manager (118), refer to FIG. 2.1.

To manage the distributed data structure, the user identity manager (112) may include functionality to append data to the distributed data structure. For example, the user identity manager (112) may append data to the distributed data structure regarding other entities that may utilize services provided by the data manager (118). For example, when a data owner desires to store data in the data manager, the user identity manager (112) may append data to the distributed data structure regarding the data owner. The data may include, for example, a public key associated with the data owner. The data appended to the distributed data structure may include additional, different, and/or less data without departing from the invention.

In one or more embodiments of the invention, the user identity manager (112) provides a method for engendering trust with other entities regarding the accuracy of information included in the distributed data structure. For example, the user identity manager (112) may implement any block chain management protocol (or other data management protocol) that enables other entities to, at least in part, verify the validity of data included in the distributed data structure. The user identity manager (112) may implement other data management protocols without departing from the invention.

Additionally, the user identity manager (112) may include functionality to enable other entities to read data included in the distributed data structure. For example, data consumers (104) may desire to read data from the distributed data structure that enables them to determine whether a data owner has rights to data stored in the data storages (108) for which corresponding data is managed by the data availability manager (110).

The data exchange manager (114) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data exchange manager (114) may be other types of computing devices without departing from the invention. For additional details regarding computing devices, refer to FIG. 5.

The data exchange manager (114) may be implemented using logical devices without departing from the invention. For example, the data exchange manager (114) may be implemented as virtual machines or other types of logical entities that utilize computing resources of any number of physical computing devices to provide the functionality of the data exchange manager (114). The data exchange manager (114) may be other types of logical devices without departing from the invention.

In one or more embodiments of the invention, the data exchange manager (114) is implemented using a computing device aggregation. A computing device aggregation may be a collection of logical and/or physical devices that cooperatively perform one or more functionalities. Different devices of the computing device aggregation may perform other types of functionalities in addition to the cooperatively performed one or more functionalities. By performing the one or more functionalities, the cooperative behavior of the computing device aggregation may give rise to the functionality of the data availability manager. For additional details regarding a computing device aggregation, refer to FIG. 1.2.

In one or more embodiments of the invention, the data exchange manager (114) provides data rights exchange services. Data rights exchange services may include (i) notifying any number of entities of data managed by the data manager (118) for which access may be granted (i.e., granting access to the data to entities that do not have access rights for the data), (ii) the conditions required for access of all, or a portion, of the data, and (iii) enabling access to the data by appending information to a distributed data structure when the conditions required for access are met.

When appending such information, the data exchange manager (114) may store the information in a distributed data structure that includes information regarding data that is available for access and the entities that currently have access rights to such data. For example, the data exchange manager (114) may maintain a trusted distributed data structure such as, for example, a block chain. For additional details regarding a block chain that includes information regarding entities that may utilize services offered by the data manager (118), refer to FIGS. 2.2-2.4.

To provide data rights exchange services, the data exchange manager (114) may utilize any number of independently executing entities such as, for example, smart contracts that define under what conditions access to data should be granted. The data exchange manager (114) may instantiate such entities based on information obtained from entities that currently have access rights to the data (e.g., data owners). The independently, executing entities may, in turn, automatically append information to the distributed data structure in response to the occurrence of conditions for which the independently, executing entities are programmed to provide access to the data to another entity (e.g., another entity that has satisfied the conditions).

To manage the distributed data structure, the data exchange manager (114) may include functionality to append data to the distributed data structure directly and/or through the independently executing entities. For example, the data exchange manager (114) may append data to the distributed data structure regarding which entities currently have access rights to data managed by the data manager (118).

In one or more embodiments of the invention, the data exchange manager (114) provides a method for engendering trust with other entities regarding the accuracy of information included in the distributed data structure. For example, the data exchange manager (114) may implement any block chain management protocol (or other data management protocol) that enables other entities to, at least in part, verify the validity of data included in the distributed data structure. The data exchange manager (114) may implement other data management protocols without departing from the invention.

Additionally, the data exchange manager (114) may include functionality to enable other entities to read data included in the distributed data structure. For example, data consumers (104) may desire to read data from the distributed data structure that enables them to determine the conditions required for access data managed by the data manager (118).

The data storages (108) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data storages (108) may be other types of computing devices without departing from the invention. For additional details regarding computing devices, refer to FIG. 5.

The data storages (108) may be implemented using logical devices without departing from the invention. For example, the data storages (108) may be implemented as virtual machines or other types of logical entities that utilize computing resources of any number of physical computing devices to provide the functionality of the data storages (108). The data storages (108) may be other types of logical devices without departing from the invention.

In one or more embodiments of the invention, the data storages (108) provide data management services. Data management services may include storing of data and providing stored data. The data storages (108) may provide such services for any type and/or quantity of data.

In one or more embodiments of the invention, data stored in the data storages (108) is registered. That is, the data may be indexed or otherwise associated with registration records. A registration record may be a data structure that includes information that enables the data to be accessed. For example, a registration record may include an identifier associated with the data. A registration record may include different, additional, and/or less information for access the data without departing from the invention.

When the data register (106) stores data in the data storages (108), the data storages (108) may provide a corresponding registration record to the data register (106). As will be discussed in greater detail below, the data register (106) may utilize the aforementioned registration record to notify other entities of the existence of the data and/or to facilitate access to the data in the future.

The data owners (102) and/or the data consumers (104) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.3. The data owners (102) and/or the data consumers (104) may be other types of computing devices without departing from the invention. For additional details regarding computing devices, refer to FIG. 5.

The data owners (102) and/or the data consumers (104) may be implemented using logical devices without departing from the invention. For example, the data owners (102) and/or the data consumers (104) may be implemented as virtual machines or other types of logical entities that utilize computing resources of any number of physical computing devices to provide the functionality of the data owners (102) and/or the data consumers (104). The data owners (102) and/or the data consumers (104) may be other types of logical devices without departing from the invention.

In one or more embodiments of the invention, the data owners (102) utilize data management services provided by the data manager (118). For example, the data owners (102) may send data to the data manager (118) for storage.

In one or more embodiments of the invention, the data consumers (104) utilize data management services provided by the data manager (118). For example, the data consumers (104) may identify data managed by the data manager (118) that is of interest, meet the conditions specified by the data manager (118) to access the data, and access the data once the conditions are met.

While illustrated as separate groups of entities, any number of entities may be both data owners and data consumers. For example, an entity may both send data to the data manager (118) for management while also obtaining access to other data managed by the data manager (118) for which the entity did not have access rights.

While the system of FIG. 1.1 has been illustrated and described as including a limited number of specific components, a system in accordance with one or more embodiments of the invention may include additional, fewer, and/or different components without departing from the invention.

As discussed above, one or more components of the system of FIG. 1.1 may be implemented as a computing device aggregation. FIG. 1.2 shows a diagram of a computing device aggregation (120) in accordance with one or more embodiments of the invention.

The computing device aggregation (120) may include any number of physical computing devices (122) and any number of logical computing devices (124). The aforementioned physical and logical devices may cooperatively perform one or more functionalities. For example, the physical computing devices (122) and/or logical computing devices (124) may be programmed to implement a corresponding distributed data structure. The distributed data structure may be, for example, a block chain. The distributed data structure may be other types of data structures without departing from the invention.

To implement the distributed data structure, all or a portion of the physical computing devices (122) and the logical computing devices (124) may host applications that control when data is added to the distributed data structure, when data of the distributed data structure is modified, and when data stored in the distributed data structure is removed. Additionally, the aforementioned devices implement an algorithm for generation of the distributed data structure that enables other entities to rely on the accuracy of the information included in a distributed data structure. For example, the aforementioned devices implement one or more components of a block chain algorithm that includes "show your work information" in the block chain. The show your work information included in the block chain may enable any entity to rely on the accuracy by being able to determine that the information included in the distributed data structure is accurate. For additional details regarding block chains, refer to FIGS. 2.1-2.5.

The physical computing devices (122) may include any number of physical computing devices (e.g., 122.2, 122.4). At any time, a physical computing device may be added or removed from the physical computing devices (122). For example, a failed computing device may be removed from the physical computing devices (122). In another example, the functionality of a physical computing device may be modified such that it no longer properly performs the functionality of the computing device aggregation (120). In such a scenario, the modified physical computing device may be removed from the physical computing devices (122). The physical computing devices (122) may be similar to that illustrated in FIG. 5.

Like the physical computing devices (122), the logical computing devices (124) may include any number of logical computing devices (e.g. 124.2, 124.4). The logical computing devices (124) may provide similar functionality to that of the physical computing devices (122), however, logical computing devices (124) may be implemented as logical rather than physical entities. For example, logical computing devices (124) may be implemented as virtual machines that utilize the physical computing resources of any number of physical computing devices to support their operation. Logical computing devices (124) may be implemented as other types of logical entities, other than that of virtual machines, without departing from the invention.

As discussed above, one or more embodiments of the invention may utilize one or more distributed data structures to support the operation of the system of FIG. 1 FIGS. 2.1-2.5 show data structures that may be utilized by the system of FIG. 1.1 in accordance with one or more embodiments of the invention. As discussed above, the distributed data structures may be implemented as block chain type data structures as illustrated in FIGS. 2.1-2.5. However, the distributed data structures may be implemented using other data structure topologies without departing from the invention.

FIG. 2.1 shows a diagram of an example identity chain (200) in accordance with one or more embodiments of the invention. The example identity chain (200) may be a data structure used by components of the system of FIG. 1.1. For example, the user identity manager (112, FIG. 1.1) may utilize a data structure similar to the example identity chain (200).

The example identity chain (200) may be implemented as a block chain that includes "show your work information" that enables other entities to trust the accuracy of information included in the example identity chain (200). For example, the "show your work information" may be proof of work or other types of proof information. While such information is not illustrated in FIG. 2.1, the example identity chain (200) may include such information to enable other entities to rely on the accuracy of the information included in the example identity chain (200).

In one or more embodiments of the invention, the example identity chain (200) includes any number of blocks (e.g. 202, 204). The blocks may include information regarding users of the system of FIG. 1.1, information regarding data managed by the system of FIG. 1.1, and/or other types of information.

In one or more embodiments of the invention, one or more of the blocks include one or more of the data owners public key (202.2), data record information (202.4), logical data location information (202.6), and/or record key (202.8). The aforementioned information may be added to the blocks of the example identity chain (200) by the user identity manager (112, FIG. 1.1). For example, the user identity manager (112, FIG. 1.1) may manage users of the data manager (118) using the example identity chain (200).

The data owner public key (202 may be a public key associated with the data owner. A private key may also be associated with the data owner. The data owner public key (202.2) may be a data structure used to determine whether or not the signature generated using the private key is authentic. Thus, by pending the data owner public key (202.2) to the example identity chain (200), other entities may determine whether or not other types of data structures of the system of FIG. 1.1 that allegedly signed using the private key are authentic.

The data record information (202.4) may be a pointer to a record used by the data storages (108, FIG. 1.1) to store data associated with the data owner having the data owner public key (202.2). For example, when data is stored in the data storages (108, FIG. 1.1), a file system such as, for example, InterPlanetary File System (IPFS) may be used to manage the data. In such a scenario, a record may associates the particular data owner with the stored data within the system. The data record information (202.4) may be a pointer to that record, wherever it may exist (e.g., in the data storages (108, FIG. 1.1) or other locations).

The logical data location information (202.6) may be a pointer to address space where data associated with the data owner having the data owner public key (202.2) is stored in the data storages (108, FIG. 1.1). In contrast to the data record information (202.4) that may be a permanent record, the logical data location information (202.6) may be modifiable due to, for example, movement of the corresponding data associated with the data owner in the storage resources of the data storages (108, FIG. 1.1).

The record key (202.8) may be one or more data structures that are keys to one or more portions of data associated with a data owner that is stored in the data storages (108, FIG. 1.1). For example, the record key (202.8) may include any number of pointers to sub portions of an address space associated with respective portions of data of the data owner. In some embodiments of the invention, no record keys may be included in the blocks. For example, in some embodiments of the invention, only the data owner public key (202.2), the data record information (202.4), and/or logical data location information (202.6) may be present in one or more of the blocks (202, 204).

FIG. 2.2 shows a diagram of an example exchange chain (210) in accordance with one or more embodiments of the invention. The example exchange chain (210) may be a data structure used by components of the system of FIG. 1.1. For example, the data exchange manager (114, FIG. 1.1) may utilize a data structure similar to the example exchange chain (210).

The example exchange chain (210) may be implemented as a block chain that includes "show your work information" that enables other entities to trust the accuracy of information included in the example exchange chain (210). For example, the "show your work information" may be proof of work or other types of proof information. While such information is not illustrated in FIG. 2.2, the example exchange chain (210) may include such information to enable other entities to rely on the accuracy of the information included in the example exchange chain (210).

In one or more embodiments of the invention, the example exchange chain (210) includes any number of blocks (e.g. 212, 214). The blocks may include information regarding data managed by the data manager (118, FIG. 1.1) that may be made available to another entity should the entity comply with requirements specified by a smart contract. For example, a smart contract (or other type of logical entity) may specify that another entity provide access to some amount of data, transfer an amount of money, complete a task, or otherwise take some action as requirements for accessing data managed by the data manager (118, FIG. 1.1).

Once an entity meets the requirements for accessing the data, one or more additional blocks reflecting that entity's ability to access the data may be appended to the example exchange chain (210). Thus, the blocks of the example exchange chain (210) may include information regarding offers for data access and completed tasks (e.g., transactions) that enable an associated entity (e.g., a data consumer) to access the data. For additional details regarding different types of content included in blocks, refer to FIGS. 2.3-2.4.

The blocks (212, 214) of the example exchange chain (210) may be appended by the data exchange manager (114, FIG. 1.1) in response to messages received from data owners, data consumers, and/or other types of entities. For example, if a data owner wishes to exchange access to the data owner's data that is managed by the data manager (118, FIG. 1), the data owner may send a corresponding request to the data exchange manager (114, FIG. 1.1). In response to the message, the data exchange manager (114, FIG. 1.1) may instantiate a corresponding smart contract and/or append information to the example exchange chain (210) that represents or otherwise indicates the availability of the data.

As discussed above, different types of information may be appended to the example exchange chain (210). For example, offers to provide access to data and/or transactions indicating that an entity is authorized to access data may be appended to the example exchange chain (210) over time.

FIG. 2.3 shows a diagram of a first example block (216) in accordance with one or more embodiments of the invention. The first example block (216) may include information regarding data that may be offered for access to other entities. First example block (216) may include, for example, a private key signed object identifier (216.2). The private key signed object identifier (216.2) may enable another entity to identify (i) the data that is being offered for access purposes, (ii) a public key stored in an identity chain to verify that particular data owner authorized inclusion of the private key signed object identifier (216.2) (e.g., that the data owner offered access to the data), and/or (iii) verify, using an example data availability chain (220), that the alleged data owner has access to the data and/or the contents of the data.

FIG. 2.4 shows a diagram of a second example block (218) in accordance with one or more embodiments of the invention. The second example block (218) may include information regarding an entity that is now authorized to access a portion of data managed by the data manager (118, FIG. 1.1). For example, the second example block (218) may include a transaction (218.2). Transaction (218.2) may be a data structure that includes information regarding an entity and data managed by the data manager (118, FIG. 1.1) that the entity is authorized to access. For example, a transaction (218.2) may be appended when a smart contract or other type of logical entity determines that the entity has met the requirements for accessing the data.

FIG. 2.5 shows a diagram of an example data availability chain (220) in accordance with one or more embodiments of the invention. The example data availability chain (220) may be a data structure used by components of the system of FIG. 1.1. For example, the data availability manager (110, FIG. 1.1) may utilize a data structure similar to the example data availability chain (220).

The example data availability chain (220) may be implemented as a block chain that includes "show your work information" that enables other entities to trust the accuracy of information included in the example data availability chain (220). For example, the "show your work information" may be proof of work or other types of proof information. While such information is not illustrated in FIG. 2.5, the example data availability chain (220) may include such information to enable other entities to rely on the accuracy of the information included in the example data availability chain (220).

In one or more embodiments of the invention, the example data availability chain (220) includes any number of blocks (e.g. 222, 224). The blocks may include information regarding data managed by the data manager (118, FIG. 1.1) and a data owner that supplied the data. For example, one or more of the blocks (222, 224) may include a private key signed object identifier (216.2) and/or data information (216.4).

The private key signed object identifier (216.2) may be an object identifier generated by the data storages (108, FIG. 1.1) when data associated with the data owner was stored in the data storages (108, FIG. 1.1). The private key signed object identifier (216.2) may be generated by a data register (106, FIG. 1.1) that manages the storage of data of each data owner in the data storages (108, FIG. 1.1). For example, when the data register (106, FIG. 1.1) stores data associated with the data owner in the data storages (108, FIG. 1.1), the data register (106) may receive a record from the data storages (108). The data register (106) may sign the object identifier using the private key of the associated data owner and store the private key signed object identifier (e.g., 216.2) in the example data availability chain (220). By doing so, traceable records that associate the data owner with the data may be appended to the example data availability chain (220).

The data information (216.4) may be a data structure that includes information regarding the data associated with the object identifier. For example, the data information (216.4) may include a description of the data. The data information (216.4) may be associated with the corresponding private key signed object identifier (216.2). Such information may be used by entities to determine whether the entities may desire access to the data.

The data information (216.4) may include any type and quantity of information regarding the data. For example, the data information (216.4) may describe the type of the data, when the data was generated, the size of the data, how the data was generated, and/or any other types of characteristics of the data.

While the data structures of FIGS. 2.1-2.5 have been illustrated as including a limited amount of specific information, the aforementioned data structures may include additional, different, and/or less information without departing from the invention. Additionally, the aforementioned data structures may be broken down into any number of data structures, be combined with other data structures that include different types of information, have different structures than that illustrated in FIGS. 2.1-2.5, and/or may be spanned across any number of persistent storages without departing from the invention.

Returning to FIG. 1.1, the data manager (118) may manage registrations of data, users, and facilitate access to stored data. FIGS. 3.1-3.4 show diagrams of methods that may be performed when the data manager (118) manages data.

FIG. 3.1 shows a flowchart of a method in accordance with one or more embodiments of the invention. The method depicted in FIG. 3.1 may be used to register a data owner with a data register in accordance with one or more embodiments of the invention. The method shown in FIG. 3.1 may be performed by, for example, a user identity manager (e.g., 112, FIG. 1.1). Other components of the system illustrated in FIG. 1.1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a public key associated with the user and the identity of the user is obtained by an identity manager.

In one or more embodiments of the invention, the public key associated with the user and the identity of the user is provided to the identity manager by the user. For example, the user may send such information to the identity manager via message. The aforementioned information may be obtained via other methods without departing from the invention.

In step 302, a private key associated with the user identity is sent to a data register.

In one or more embodiments of the invention, the private key is obtained from the user. The private key and the public key may form a key pair that may be used to confirm the authenticity of data structures signed using the private key.

For example, the public key, once sent to the identity manager, may be posted to a block chain. Other entities, upon receiving a data structure signed by the private key may use the public-key to validate the authenticity of the signing.

The method may end following step 302.

FIG. 3.2 shows a flowchart of a method in accordance with one or more embodiments of the invention. The method depicted in FIG. 3.2 may be used to register data in accordance with one or more embodiments of the invention. The method shown in FIG. 3.2 may be performed by, for example, a data register e.g., 106, FIG. 1A). Other components of the system illustrated in FIG. 1.1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, data associated with an identity is obtained. The data may be obtained from any source and via any method. For example, the data may be obtained from one or more data providers.

The data providers may be any types of devices. For example, the data providers may be persistent storage, data generating devices such as Internet of things devices, sensors, or any other type of computing device that may be able to provide data.

In step 312, an object identifier for the data is obtained by storing the data as a record in a data storage.

As discussed above, the data storages may generate records associated with data stored in the data storages. When data is recorded, an object identifier may be assigned to the data. The data storages may provide the object identifier in response to data being stored in the data storages. In one or more embodiments of the invention, the object identifier is a data structure that includes information that may enable an entity to request the data associated with the object identifier. Object identifier may be any type of data structure that enables other entities to request access to the data.

In step 314, the record of storing the data is stored using a private key associated with the user identity (e.g., the user that has rights to the data obtained in step 310) via a data availability manager and the object identifier is stored. The record and object identifier may be stored in a distributed data structure, e.g., a data availability chain or other type of distributed data structure. The record of storing the data may be signed using the private key when storing the record. For example, the record may be stored by signing the object identifier obtained in step 312 using a private key and storing the signed object in the distributed data structure.

Additionally, a description of the data (e.g., data information (216.4) may also be stored, along with the signed object identifier.

The method may end following step 314.

Via the method illustrated in step 314, the contents as well as availability, information for data associated with a user may be stored in a distributed data structure that may enable other entities to access the stored information. By doing so, other entities may learn of the existence of the data and/or validate the existence of the data without needing to access the data or metadata regarding the data stored in the data storages.

FIG. 3.3 shows a flowchart of a method in accordance with one or more embodiments of the invention. The method depicted in FIG. 3.3 may be used to provide access to data in accordance with one or more embodiments of the invention. The method shown in FIG. 3.3 may be performed by, for example, a data exchange manager (e.g., 114, FIG. 1.1). Other components of the system illustrated in FIG. 1.1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 320, a data exchange proposal for a smart contract is obtained.

In one or more embodiments of the invention, the data exchange proposal for the smart contract is obtained from a data owner that has access rights to data. The data exchange proposal may specify requirements that must be met for another entity to be authorized to access the data. The data exchange proposal may be obtained from other entities without departing from the invention.

The data exchange proposal may specify any number of requirements must be met for an entity to be provided with access to the data. For example, the data exchange proposal may specify that a predetermined quantity of currency must be provided before access to the data will be authorized.

In step 322, it is determined whether the requirements of the smart contractor met. For example, following step 320, a smart contract is instantiated based on the data exchange proposal. The smart contract may continuously, periodically, or otherwise monitor whether an entity has met the requirements of the smart contract. If such requirements are met, the smart contract may notify the data exchange manager by, initiating a protocol for appending data to an exchange chain or other type of distributed data structure.

If it is determined that the requirements of the smart contract are not met, the method may end following step 322. If the requirements of the smart contract are met, the method may proceed to step 324.

In step 324, an action set to provide access to the data associated with the data exchange proposal is performed.

In one or more embodiments of the invention, the action set includes a pending transaction to the exchange chain. The transaction may be a data structure that specifies that an entity associated with the transaction has met the requirements of the smart contract and is to be provided with access to the data associated with the data exchange proposal.

The action set may further include verifying authenticity of the data exchange proposal. For example, the data exchange manager may query an identity chain to determine whether a data owner has access to data implicated by the data exchange proposal (i.e., data that the data owner proposes to exchange).

The action set may further include sending an object identifier to the data storages for accessing the data. In response, the data storages may verify that the entity that sent the object identifier is authorized to access the data, may verify that the data owner the proposed to provide access to the data is the owner of the data, and/or may verify the identity of any of the aforementioned entities. For example, to verify the identities of the entity requesting to access the data in the data owner, an identity chain may be queried. Similarly, verify that the data owner proposing to exchange the data has access rights to the data, the object ID may be compared to similar information included in the data availability chain. To verify that the data owner desires to exchange access to the data; the data storages may query the exchange chain to verify that the data exchange proposal is authentic.

The method may end following step 324.

Step 322 may be repeated in a number of times and over any period of time to determine whether any entity has met the requirements of the data exchange proposal. For example, an entity may at first not meet the requirements of the data exchange proposal by failing to append information to a distributed ledger indicating that the transfer of currency sufficient to meet the requirements of the data exchange proposal to the data owner has been completed. However, at a later point in time; the entity may meet the requirements of the data exchange proposal. In such a scenario, the smart contract may take action in response to the smart contract requirements being met.

Via the method illustrated in FIG. 3.3, data consumers or other entities may obtain access to data managed by the data manager by appending appropriate information to distributed ledgers or other types of data structures that may be tracked by smart contracts or other types of logical entities that may be employed to enforce data exchange proposals.

FIG. 3.4 shows a flowchart of a method in accordance with one or more embodiments of the invention. The method depicted in FIG. 3.4 may be used to determine whether to provide access to data in accordance with one or more embodiments of the invention. The method shown in FIG. 3.4 may be performed by, for example, data storages (e.g., 108, FIG. 1.1). Other components of the system illustrated in FIG. 1.1 may perform all, or a portion, of the method of FIG. 3.4 without departing from the invention.

While FIG. 3.4 is illustrated as a series of steps, any of the steps may be omitted, performed in a different order, additional steps may be included, and/or any or all of the steps may be performed in a parallel and/or partially overlapping manner without departing from the invention.

In step 330, a data access request that includes an object identifier and identity of the requester is obtained.

In one or more embodiments of the invention, the data access request is obtained from an entity attempting to access data stored in the data storages. For example, the data access request may be obtained from a data consumer or another type of entity.

In one or more embodiments of the invention, the object identifier was generated when the data was stored in the data storages and the object identifier was generated by the data storages. Object identifier includes access information for the data.

In one or more embodiments of the invention, the identity of the requester is the name or other type of identity of the requester.

In step 332, it is determined whether an exchange chain indicates that the requester is authorized to access the data.

In one or more embodiments of the invention, the determination is made by, comparing the identity of the requester obtained in step 330 to information included in the exchange chain. For example, the exchange chain may be interrogated to determine whether any transaction appended to the exchange chain indicates that identity of the requester is authorized to access the data.

In one or more embodiments of the invention, the determination is made, at least in part, by verifying the identities of the data owner associated with the data and identity of the requester with an identity chain. For example, the identity chain may be interrogated to determine whether the identities of the data owner and/or the data requester are included in the identity chain.

In one or more embodiments of the invention, the determination is made, at least in part, by verifying that the data owner associated with the data has access rights to the data. For example, a data availability chain may be interrogated to determine whether the identity of the alleged data owner is associated with the data information included in the data availability chain. For example, the data availability chain may include a private key signed object identifier for the data that can be verified using an identity chain for the alleged data owner that includes a data owner public key.

If it is determined that the exchange chain indicates that the requester is authorized to access the data, the method may proceed to step 334. If it is determined that the exchange chain does not indicate that the requester is authorized to access the data, the method may end following step 332.

In step 334, access to the data associated with the data access request is provided. For example, a copy of all or a portion of the data is provided to the requester. Access to the data may be provided via other methods without departing from the invention.

The method may end following step 334.

Thus, via the method illustrated in FIG. 3.4, access to data may be provided in a manner that verifies that entities requesting access to the data have appropriate rights for accessing the data.

To further clarify embodiments of the invention, a non-limiting example is provided in FIGS. 4.1-4.4. FIG. 4.1 may illustrate a diagram of a system similar to that of FIG. 1.1 and FIGS. 4.2-4.4 may show interaction diagrams of series of interactions between components of the system of FIG. 1.1. For the sake of brevity, only a limited number of components of the system of FIG. 1.1 are illustrated in each of FIGS. 4.1-4.4.

EXAMPLE

Consider a scenario as illustrated in FIG. 4.1 in which a data manager (118) is providing data management services for data owners (102). The data owners (102) may have a temperature sensing device (400) that is generating data for which the data owners (102) desire the data manager (118) to provide management services.

To provide such services, the temperature sensing device (400) may send data reflecting temperature measurements to the data register (106). FIG. 4.2 shows an interaction diagram between the temperature sensing device (400) and different components of the data manager (118).

At a first point in time, data (410) reflecting the temperature sensor measurements is sent to the data register (106). When sent to the data register (106), the data register (106) sends the data (412) to data storages (108) for storage. In response to obtaining the data (412), the data storages (108) store the data and generate an object identifier (414) which it sends to the data register (106). To document the existence of the stored data that is now managed by the data manager (118), the data register (106) generates a record (416). The record (416) includes a copy of the object identifier (414) signed using a private key associated with a data owner that has access rights to the temperature sensing device (400) data (410).

After generating the record (416), the data register (106) sends the record (416) to a data availability manager (110). In response to receiving the record (416), the data availability manager (110) updates the data availability chain using the record (418). For example, the data availability manager (110) may append the record (416) as a portion of a block of the data availability chain.

After the record of the data being managed by the data manager is generated, a data owner of the data owners (102) may desire to provide other entities with access to the data. FIG. 4.3 shows a second interaction diagram between the data owner that has access rights to the data and the data manager (118). To initiate the process of providing other entities with access to the data, the data owner that has access to the data may send a data exchange proposal (420) to a data exchange manager (114).

After receiving the data exchange proposal (420), the data exchange manager (114) may send a verification request (422) to a user identity manager (112). The verification request (422) may include an identity of the data owner that is proposing to provide other entities with access to the data.

In response to receiving the verification request (422), the user identity manager (112) may compare an identity of the data owner to an identity chain. By doing so, information indicative of data to which the alleged data owner has rights may be ascertained. Based on the comparison, the user identity manager (112) may generate and/or send a verification response (426) in response to the verification request (422) to the data exchange manager (114). The verification response (426) may specify whether the alleged data owner as rights to the data implicated by the data exchange proposal (420).

If the verification response (426) indicates that the alleged data owner does have access rights to the data, the data exchange manager (114) may append a private key signed object identifier to an exchange chain. By doing so, the availability of accessing the data may be advertised to other entities via the inclusion of the private key signed object identifier in the exchange chain. The private key signed object identifier may be utilized by other entities to determine the authenticity of the availability of the data.

In addition to appending a private key signed object identifier (424), the data exchange manager (114) may instantiate a smart contract or other logical entity for enforcing the data exchange proposal (420) at a future point in time.

After a period of time, a data consumer may meet the requirements of the smart contract and thereby be granted access to the data via a transaction being appended to the exchange chain. FIG. 4.4 shows an interaction diagram between a data consumer (104) and the data manager (118) when the user initially attempts to access the data.

To attempt to access the data, the data consumer (104) may generate and/or send a data access request (430) to the data storages (108). The data access request (430) includes an object identifier associated with the data to which the data consumer (104) is requesting access.

In response to receiving the data access request (430) the data storages (108) may generate three verification requests (432, 436, 440). The verification requests may be sent to the data exchange manager (114), the user identity manager (112), and the data availability manager (110) respectively.

The verification request (432) sent to the data exchange manager (114) may include an identity of the data consumer (104). In response to receiving the verification request (432) the data exchange manager (114) may determine whether a transaction matches the identity of the data consumer (104). The data exchange manager (114) may generate and/or send a verification response (434) based on the determination with respect to whether any transaction matches the identity of the data consumer (104). If the identity of the data consumer (104) matches that of one of the transactions, the verification response (434) may indicate that the data consumer (104) has access rights to the data. In contrast, the verification response (434) may indicate that the data consumer (104) does not have access rights to the data if the identity of the data consumer (104) does not match any transactions.

The verification request (436) sent to the user identity manager (112) may include an identity of the data owner associated with the data. For example, the private key signed object identifier may be sent to the user identity manager (112). The public key of the alleged data owner included in the identity chain may be used to ascertain whether the private key signed object identifier is authentic. If it is determined that the private key signed object identifier is authentic, the user identity manager (112) may generate and/or send a verification response (438) indicating that the data owner has access rights to the data. If it is determined that the private key signed object identifier is not authentic, the verification response (438) may indicate that the data owner does not have access rights to the data.

The verification request (440) sent to the data availability manager (110) may include the public key associated with the data owner included in the identity chain and the private key signed object identifier. In response to receiving the verification request (440), the data availability manager (110) may identify the data using the private key signed object identifier and determine whether the alleged data owner has access rights to the data using the public key. If it is determined that the alleged data owner has rights to the data, the data availability manager (110) may generate and/or send a verification response (442) indicating that the alleged data owner has access rights to the data. If it is determined that the alleged data owner does not have rights to the data, the verification response (442) may indicate that the data owner does not have access rights to the data.

After receiving each of the verification responses (434, 438, 442), the data storages may determine whether the data consumer (104) should be provided with access to the data. The data storages (108) may determine that the data consumer (104) should have access to the data when all the verification responses indicate that both the data consumer (104) and the data owner have access rights to the data.

If it is determined that the data consumer (104) should have access to the data, the data storages (108) may provide data access (444) to the data to the data consumer (104).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide methods, devices, and/or systems for managing data. Specifically, embodiments of the invention may provide a method for registering data as it is received, storing the data in a trusted manner, and facilitating access to the data in a verifiable manner. By doing so, embodiments of the invention may provide a system that improve the likelihood of the availability of data, facilitates access to the data, and enables data owners to authorize other entities to access data to which the data owners have rights.

The problems discussed above should be understood as being examples of problems solved by embodiments of the invention disclosed herein and the invention should not be limited to solving the same/similar problems. The disclosed invention is broadly, applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data manager, comprising:
   a computer processor for executing instructions;
   data storages for storing:
      an identity chain, wherein the identity chain comprises a public key associated with an entity of data, a pointer associated with a permanent record of the data, and a second pointer associated with a portion of the data storages, and
      a data availability chain, wherein the data availability chain comprises a private key signed object identifier for the data; and
   a data register, wherein the data storages comprise the instructions that when executed by the computer processor, the instructions cause the data register to:
      obtain the data associated with the entity, wherein the entity registered with the identity chain using the public key associated with the entity, wherein the public key verifies that the private key signed object identifier is authentic;
      obtain an object identifier associated with the data by storing the data in the data storages as a record, wherein the data storages generate the record; and
      record, on the data availability chain, both of:
         the record using a private key associated with the entity, and
         the object identifier.

2. The data manager of claim 1, further comprising:
   a data exchange manager programmed to:
      obtain a data exchange proposal for a smart contract associated with the data, wherein the data exchange proposal specifies authorized data access requirements for a second entity;
      make a determination that the second entity meets requirements of the smart contract, wherein the requirements of the smart contract are requirements for accessing the data; and
      perform an action set to provide access to the data based on the determination, wherein the action set comprises verifying authenticity of the data exchange proposal, and wherein performing the action set comprises:
         appending a transaction to an exchange chain, wherein the transaction specifies an identity of the second entity.

3. The data manager of claim 2, further comprising:
   the data storages programmed to:
      obtain a data access request, wherein the data access request comprises the object identifier and the identity of the second entity;
      make a determination that the exchange chain indicates that the second entity is authorized to access the data based on the appended transaction; and
      provide access to the data based on the determination.

4. The data manager of claim 3, wherein making the determination that the exchange chain indicates that the second entity is authorized to access the data based on the appended transaction comprises:
  verifying the identity of the second entity based on the identity chain;
  verifying that the second entity is authorized to access the data based on the exchange chain; and
  verifying an owner of the data authorized the smart contract.

5. The data manager of claim 2, wherein appending the transaction to the exchange chain comprises:
  determining an identity and a key for the transaction based on the identity chain; and
  basing the transaction, at least in part, the identity and the key,
  wherein the key is associated with the public key stored in the identity chain.

6. The data manager of claim 1, wherein the object identifier is associated with the portion of the data, wherein the portion of the data storages stores the data.

7. The data manager of claim 1, wherein the data register is further programmed to:
  record, on the data availability chain, metadata regarding the data.

8. The data manager of claim 7, wherein the metadata comprises a description of contents of the data.

9. The data manager of claim 1, wherein the identity chain is immutable.

10. The data manager of claim 1, wherein the data availability chain is immutable.

11. A method of operating a data manager, comprising:
  obtaining data associated with an entity, wherein the entity registered with an identity chain using a public key associated with the entity, wherein the public key verifies that a private key signed object identifier for the data is authentic, wherein the identity chain comprises the public key associated with the entity, a pointer associated with a permanent record of the data, and a second pointer associated with a portion of data storages, wherein the data manager comprises the data storages;
  obtaining an object identifier associated with the data by storing the data in the data storages as a record, wherein the data storages generate the record; and
  recording, on a data availability chain, both of:
    the record using a private key associated with the entity, and
    the object identifier, wherein the data availability chain comprises the private key signed object identifier.

12. The method of claim 11, further comprising:
  obtaining a data exchange proposal for a smart contract associated with the data, wherein the data exchange proposal specifies authorized data access requirements for a second entity;
  making a determination that the second entity meets requirements of the smart contract, wherein the requirements of the smart contract are requirements for accessing the data; and
  performing an action set to provide access to the data based on the determination, wherein the action set comprises verifying authenticity of the data exchange proposal, and wherein performing the action set comprises:
    appending a transaction to an exchange chain,
    wherein the transaction specifies an identity of the second entity.

13. The method of claim 12, further comprising:
  obtaining a data access request, wherein the data access request comprises the object identifier and the identity of the second entity;
  making a determination that the exchange chain indicates that the second entity is authorized to access the data based on the appended transaction; and
  providing access to the data based on the determination.

14. A non-transitory computer readable medium comprising computer readable program code, which when executed by a computer processor enables the computer processor to perform a method for operating a data manager, the method comprising:
  obtaining data associated with an entity, wherein the entity registered with an identity chain using a public key associated with the entity, wherein the public key verifies that a private key signed object identifier for the data is authentic, wherein the identity chain comprises the public key associated with the entity, a pointer associated with a permanent record of the data, and a second pointer associated with a portion of data storages, wherein the data manager comprises the data storages;
  obtaining an object identifier associated with the data by storing the data in the data storages as a record, wherein the data storages generate the record; and
  recording, on a data availability chain, both of:
    the record using a private key associated with the entity, and
    the object identifier, wherein the data availability chain comprises the private key signed object identifier.

15. The non-transitory computer readable medium of claim 14, further comprising:
  obtaining a data exchange proposal for a smart contract associated with the data, wherein the data exchange proposal specifies authorized data access requirements for a second entity;
  making a determination that the second entity meets requirements of the smart contract, wherein the requirements of the smart contract are requirements for accessing the data; and
  performing an action set to provide access to the data based on the determination, wherein the action set comprises verifying authenticity of the data exchange proposal, and wherein performing the action set comprises:
    appending a transaction to an exchange chain,
    wherein the transaction specifies an identity of the second entity.

16. The non-transitory computer readable medium of claim 15, further comprising:
  obtaining a data access request, wherein the data access request comprises the object identifier and the identity of the second entity;
  making a determination that the exchange chain indicates that the second entity is authorized to access the data based on the appended transaction; and
  providing access to the data based on the determination.

* * * * *